US009274811B1

(12) United States Patent
Reeves et al.

(10) Patent No.: US 9,274,811 B1
(45) Date of Patent: Mar. 1, 2016

(54) SYSTEM AND METHOD FOR CLOUD PROVISIONING AND APPLICATION DEPLOYMENT

(75) Inventors: Robert E. Reeves, Austin, TX (US); Daniel Preston Nelson, Austin, TX (US)

(73) Assignee: BladeLogic, Inc., Houston, TX (US)

( * ) Notice: Subject to any disclaimer, the term of this patent is extended or adjusted under 35 U.S.C. 154(b) by 1408 days.

(21) Appl. No.: 12/904,785

(22) Filed: Oct. 14, 2010

Related U.S. Application Data

(63) Continuation-in-part of application No. 12/032,087, filed on Feb. 15, 2008.

(60) Provisional application No. 60/901,990, filed on Feb. 16, 2007, provisional application No. 61/252,036, filed on Oct. 15, 2009.

(51) Int. Cl.
*G06F 9/44* (2006.01)
*G06F 9/445* (2006.01)

(52) U.S. Cl.
CPC .................................. *G06F 9/445* (2013.01)

(58) Field of Classification Search
None
See application file for complete search history.

(56) References Cited

U.S. PATENT DOCUMENTS

| | | | |
|---|---|---|---|
| 6,523,065 B1 | 2/2003 | Combs et al. | |
| 6,578,068 B1 | 6/2003 | Bowman-amuah | |
| 6,823,376 B1 | 11/2004 | George et al. | |
| 6,880,002 B2 * | 4/2005 | Hirschfeld et al. | 709/223 |
| 6,898,705 B2 * | 5/2005 | Abboud et al. | 713/100 |
| 6,968,389 B1 | 11/2005 | Menditto et al. | |
| 7,032,022 B1 * | 4/2006 | Shanumgam et al. | 709/225 |
| 7,200,632 B1 | 4/2007 | Greschler et al. | |
| 7,802,087 B2 | 9/2010 | Gatto et al. | |
| 7,818,515 B1 * | 10/2010 | Umbehocker et al. | 711/154 |
| 8,849,971 B2 * | 9/2014 | Ferris | 709/223 |
| 8,918,779 B2 * | 12/2014 | Nichols et al. | 717/174 |
| 2002/0156756 A1 | 10/2002 | Stanley et al. | |
| 2003/0233631 A1 | 12/2003 | Curry et al. | |
| 2004/0002880 A1 | 1/2004 | Jones | |

(Continued)

FOREIGN PATENT DOCUMENTS

EP  1826669 A1  8/2007

OTHER PUBLICATIONS

Final Office Action for U.S. Appl. No. 12/032,087 dated Apr. 25, 2013, 31 pages.

(Continued)

*Primary Examiner* — Evral Bodden

(57) ABSTRACT

Embodiments described herein provide systems and methods for installing or otherwise supporting applications in a cloud environment and systems and methods for provisioning a cloud environment. One embodiment includes abstracting a set of configuration information associated with a first environment into a set of environment independent attributes and a set of environment dependent attributes. A second environment may then be configured using the mapped environment independent attributes and the values for the set of environment dependent attributes. If the second environment is a cloud environment, embodiments described herein can include provisioning the cloud environment by mapping hardware and/or software characteristics of the first environment and/or user selected characteristics to abstractions of the characteristics and sending API calls to a cloud environment interface based on the abstractions of the characteristics to provision a selected target environment in the cloud environment.

14 Claims, 8 Drawing Sheets

(56) References Cited

U.S. PATENT DOCUMENTS

| | | |
|---|---|---|
| 2004/0172412 A1 | 9/2004 | Files et al. |
| 2005/0101310 A1* | 5/2005 | Shachak ............... 455/418 |
| 2005/0256834 A1* | 11/2005 | Millington et al. ............. 707/1 |
| 2005/0289536 A1* | 12/2005 | Nayak et al. ............... 717/174 |
| 2006/0015527 A1 | 1/2006 | Dingle |
| 2008/0175266 A1 | 7/2008 | Alperovitch et al. |
| 2009/0138577 A1 | 5/2009 | Casado et al. |
| 2010/0125669 A1 | 5/2010 | Esfahany et al. |
| 2010/0223385 A1* | 9/2010 | Gulley et al. ............... 709/226 |
| 2012/0143821 A1 | 6/2012 | Mallya et al. |

OTHER PUBLICATIONS

U.S. Appl. No. 12/032,087 Final Office Action mailed May 24, 2012, 34 pages.

"XML—Managing Data Exchange", Retrieved from <http://en.wikibooks_org/wiki/XML_-_Managing_Data_Exchange/A_single_entity>, (Jan. 29, 2007), 1-29 pages.

U.S. Appl. No. 12/032,087 Non-Final Office Action mailed Sep. 20, 2012, 35 pages.

Non-Final Office Action for U.S. Appl. No. 12/032,087, mailed Apr. 24, 2015, 48 pages.

* cited by examiner

SYSTEM AND METHOD FOR CLOUD PROVISIONING AND APPLICATION DEPLOYMENT

RELATED APPLICATIONS

This application claims the benefit of priority under 35 USC 119(e) to U.S. Provisional Patent Application No. 61/252,036, entitled "System and Method for Cloud Provisioning and Application Deployment" filed Oct. 15, 2009 and under 35 USC 120 as a continuation-in-part of U.S. patent application Ser. No. 12/032,087 entitled "System and Method for Installing, Updating and Uninstalling Applications" filed Feb. 15, 2008 which claims priority under 35 USC 119(e) to U.S. Provisional Patent Application No. 60/901,990, entitled "System and Method for Installing, Updating and Uninstalling Applications" filed Feb. 16, 2007, each of which is hereby fully incorporated by reference herein.

TECHNICAL FIELD

Embodiments described in this disclosure relate generally to application deployment and support. More particularly, embodiments described herein related to application deployment and support in a cloud environment.

BACKGROUND

Software lifecycles begin in the development environment in which developers strive to create and perfect the program. As development proceeds various versions of the application evolve on the development server(s) used to code, test, and debug the application. Frequently, each version of the application requires different resources from the server in order to run properly. Likewise, because the environment of each server can differ from the others, the installation of an application on a particular server often requires resources from that server that may be unique to that server. Once the application is operational, each installation in a large scale deployment can be virtually unique thereby creating a nightmare for the support team called upon to deploy the application. These difficulties occur across a wide range of technologies other than application servers including, but not limited to, mobile telecommunication networks, database servers, computing networks (LANs or WANs), web servers, and enterprise service buses.

For instance, Java Platform Enterprise Edition (referred to as J2EE) is a platform for developing and executing distributed, multi-tiered, Java applications. In this case, deployment is the act of installing components for a J2EE application and configuring a J2EE Application Server to run the J2EE application. Deployment of these applications can occur multiple times to multiple targets during the development life cycle and can occur to application servers provided by a multiplicity of vendors. Because each application server may be configured differently, configuring application servers during deployment can be a time consuming and inefficient task.

Current deployment methods include manual deployment, using vendor specific GUI applications (i.e., installation "wizards"), using vendor specific command line tools (e.g., scripting etc.) and creating custom installation utilities. These current methods, however, suffer several shortcomings. Manual deployment is time consuming and error prone during both initial installation at a target and during updating. Furthermore, documentation related to the changes needed for the application server must be manually updated after changes to the application or the application server. Manual installation also provides limited, if any, versioning. Using vendor specific GUI applications also leads to time consuming and error prone installations and updates. Furthermore, installation applications are typically tied to the particular vendor's system, necessitating the purchase of multiple installation applications if the code is to be installed on multiple vendors' servers. Training is also typically required for each vendor's system. Likewise, vendor specific command line tools require developer intervention for changes and are also often tied to a single vendor's system. Thus, changes are difficult to synchronize across multiple vendors' systems. Moreover, vendor specific command line tools are time consuming for the developer, lack versioning, require training and also require manual updates. Similarly, existing custom utilities are generally expensive, time consuming and are not adequately robust to handle a variety of installations on multiple vendors' systems.

SUMMARY OF THE DISCLOSURE

Embodiments provide systems and methods of supporting applications that eliminate, or at least substantially reduce, the shortcomings of prior art systems and methods for supporting applications.

One embodiment makes installing applications (and performing other operations on the application) as easy as installing a desktop application. Today, typical J2EE applications include a configuration document or script, and a set of files that contain the actual program code, property files, and other settings. To install the application, the code and the other files have to be copied to the correct location on the target application server and the appropriate configuration settings made. Embodiments described herein are different from these conventional techniques. Instead of a collection of files and configuration information, one embodiment can include just the binary files and a relatively small XML document that describes how the application should be configured. IT support staff can then copy the files and execute a lightweight program constructed in accordance with the one embodiment to install the application in any environment (e.g., development, test, or production) or application server (for example JBoss, Websphere, or WebLogic) that the code supports. The program can then automatically configure and deploy the application correctly.

In one embodiment, once the developer has written the application and configured the development environment, the developer points the program to the development server. The program analyzes the server configuration and creates a representation of it. The program can take the configuration information it captured and the built application and deploy the application to different environments and to any server type that the application code supports. Furthermore, the program can make all of the necessary configuration translations automatically.

Embodiments described herein offer several advantages over the prior art. First, it is faster than manual deploying the application and requires a fraction of the development time that using custom utilities and other previously available techniques require. As a result, an installation performed in accordance with the one embodiment can take approximately 5% of the time required using previously available techniques.

Second, embodiments described herein can vastly reduce configuration defects in part by automating the deployment process and providing a single application configuration file for all different environments and server platforms. Embodiments described herein can also avoid configuration errors attributable to oversight and human error, that is, unintentional mistakes.

Third, embodiments of the present disclosure make deployment a non-technical task. One can simply double click on the program icon, answer a few questions, and the program can deploy the application to the specified server(s). Developers can therefore spend their time developing applications (a value-added activity), not deploying them (often considered an expense). Additionally, various embodiments allow developers to version, upgrade, and even install applications in ways that the prior art cannot.

Furthermore, embodiments described herein provide a flexible deployment and support architecture. For example, suppose a customer is having a difficult time getting the application installed. Using the provided architecture, the customer can pull down the configuration information of the faulty installation and send that XML file to IT support, where an exact replica of the customer's environment can be built in the support laboratory. In addition, the architecture can also be used to manage licensed software by generating reports on existing or suspected installations thereby allowing the identification of unlicensed installations.

Embodiments described herein provide a method which includes querying a first server program for a first set of configuration information and identifying sets of environment independent and dependent attributes from the configuration information (using, for example, predefined rules). The values for the environment independent attributes are mapped to, and stored in, a user selected format (e.g., XML). Values for the environment dependent attributes are also stored in that format. The method may include querying other server programs and identifying another set of environment dependent attributes. If so, then the environment independent attributes and one of the sets of environment dependent attributes may be used to configure an environment (e.g., a J2EE environment). The configuration (and other operations provided herein) may be wrapped in a transaction which may include a look ahead sub-process. The look ahead process allows the operation to tolerate unexpected conditions that might be encountered during the operation such as the presence of an attribute which is to be installed or the absence of an attribute which is to be deleted. Change logging may occur during these operations and, indeed, state and prospective change reports may be generated to indicate which changes would occur were a given operation to be performed. Version skipping during application installations may also be provided. The method may also provide application un-installations. The environments in which these activities occur may be associated with either operational or development servers among other environments.

Another embodiment also provides a method which includes abstracting a set of configuration information associated with a first environment into a set of environment independent attributes and a set of environment dependent attributes. The environment independent attributes may be mapped to a user selected format whereas the environment dependent attributes are replaced with tokens and then, optionally, with values. A second environment may then be configured using the mapped environment independent attributes and the values for the set of environment dependent attributes.

One embodiment provides a computer readable medium carrying computer-executable program instructions implementing a method which includes abstracting a set of configuration information associated with a first environment into a set of environment independent attributes and a set of environment dependent attributes. The set of environment independent attributes are mapped to a user selected format and the set of environment dependent attributes are replaced with tokens. The mapped attributes and tokens are stored in a memory.

Another embodiment provides a configuration mapping system which includes an interface, a memory, and a processor in communication with the interface and the memory. The processor receives a user selected format and queries a first server program for a set of configuration information via the interface. The processor identifies a set of environment independent attributes and a set of environment dependent attributes from the set of configuration information. It also maps the set of environment independent attributes into the user selected format and creates tokens for the set of environment dependent attributes. The processor then stores the mapped environment independent attributes and the tokens in the memory. Optionally, the interface may include a wide area network which is in communication with a plurality of servers. Thus, the processor can configure each of the servers using the mapped environment independent attributes and the tokens stored in the memory.

In another embodiment, a method of supporting an application is provided. Since applications typically require resources to run due to the server environment and resources which they require regardless of the server on which they are installed, the method of the one embodiment determines a listing of the resources required to support the application due to the server environment. This listing is apart from the listing of resources required by the application itself regardless of the environment. More particularly, to determine how many resources of that type are required for the application, the application server can be queried for each type of resource known to be required for the application. The server can respond by, for instance, returning a JMX object(s) with the requested information. In turn, this object can be converted to an XML document. A rule set can then be used to determine which resources are required due to the server environment and which resources are required due to the application itself. In any event, the listing of server related requirements is then output. Of course, the non server related requirements may also be output and the two listings used as a "state report" for the server. If at a later time, it is desired to learn if any changes have occurred to the server, a second state report can be generated and compared to the first state report. In this way malicious changes can be detected and the server can be restored to the last known good state using the first report.

Where multiple servers have been analyzed, one of the lists of server related resources (and a list of the application related resources) may then be used to install the application on another server(s) or to re-install it on a server where it is already hosted. Of course, if a particular deployment requires installation on multiple servers, a server related resource listing may be selected for each of the servers individually. Optionally, the target server can be either an operational or a development server and the source server can be the other type of server. More particularly, if an operational application requires troubleshooting, the resource listing related to the operational server can be used to configure a development server to re-create the application's operational environmental thereby facilitating the troubleshooting.

Installations performed in accordance with the one embodiment can also be performed automatically even if unexpected situations occur during the installation. For instance, if the installation encounters a required resource that is already configured for the application, the installation may proceed despite what might otherwise cause a script to fail.

Likewise, if a resource that ought to be deleted does not exist on the server, the installation may proceed anyway (without failing as scripts often do). Additionally, the installations can be performed as transactions so that, should the transactions fail, the changes made to the servers will be automatically reversed. In a similar manner, an application can be uninstalled by using the resource lists to identify and remove resources particular to the application from the server.

Embodiments described herein also allow for the creation of a prospective change report detailing what should change during an installation (or de-installation). More specifically, an installation transaction can be started on a server, allowed to all but complete, and then aborted. If the changes made to the server are logged during the installation the log can be used to show what needs to be changed on the server. But, because the transaction was aborted, the changes are undone, or rolled back, leaving the server as it was before the change report was generated.

Furthermore, various embodiments allow "version skipping" during application installations. That is, by using a resource list associated with the new version and a resource list for the server, all the resources required to support the new version may be configured without having to first install each intermediate version of the application. Otherwise, at least with many applications, it is possible that skipping a version will cause some configuration procedure associated with an intermediate version to be skipped. The result, of course, can be an inoperable application or, in other words, a failed installation.

In another embodiment, a method of supporting a mobile telecommunication network is provided. The method of the one embodiment includes determining, from a device with a mobile application installed thereon, a listing of the resources required to support the mobile application due to the device environment. The list of device related resources is then output. Optionally, the device may be a handset, a telecommunications network node, or a development platform. Thus applications may be installed on these (and other types of telecommunications equipment) using a list of device related resource requirements and a list of mobile application related requirements.

In yet another embodiment, a method of supporting a network is provided. The method of the one embodiment includes determining, from a device on the network, a listing of the resources required to support an application on the device. The list of device related resources required to support the application is also output in the one embodiment. Still another embodiment provides a method of supporting a database server. In the method of the one embodiment a listing of the server related resources required to support the database is determined and output. In yet another embodiment a method of supporting a web-server is provided. In the one embodiment, a list of server related support resources is determined for the web-server program. The list is then output.

Embodiments described herein also provide for provisioning of cloud environments. One embodiment can comprise: determining a first set of environment characteristics for the first environment, wherein the first set of environment characteristics comprise hardware characteristics; receiving a set of user selected environment characteristics; mapping the first set of environment characteristics and the set of user selected environment characteristics to a set of abstracted characteristics; mapping the set of abstracted characteristics to API calls for a cloud environment, the API calls selected to provision a selected target environment in the cloud environment and interacting with a cloud environment API using the API calls to configure the cloud environment to provide the selected target environment.

Embodiments described herein can provide advantages by significantly reducing the time and knowledge required to provision a cloud environment and install an application.

BRIEF DESCRIPTION OF THE FIGURES

A more complete understanding of the disclosure and the advantages thereof may be acquired by referring to the following description, taken in conjunction with the accompanying drawings in which like reference numbers indicate like features and wherein.

DETAILED DESCRIPTION

Various embodiments are illustrated in the FIGURES, like-numerals being used to refer to like and corresponding parts of the various drawings.

As used herein, the terms "comprises," "comprising," "includes," "including," "has," "having" or any other variation thereof, are intended to cover a non-exclusive inclusion. For example, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

Embodiments provide systems and methods for supporting applications in a variety of environments including, but not limited to, application servers, mobile telecommunication networks, database servers, computing networks (LANs or WANs), cloud environments, web servers, and enterprise services.

Figure 1:
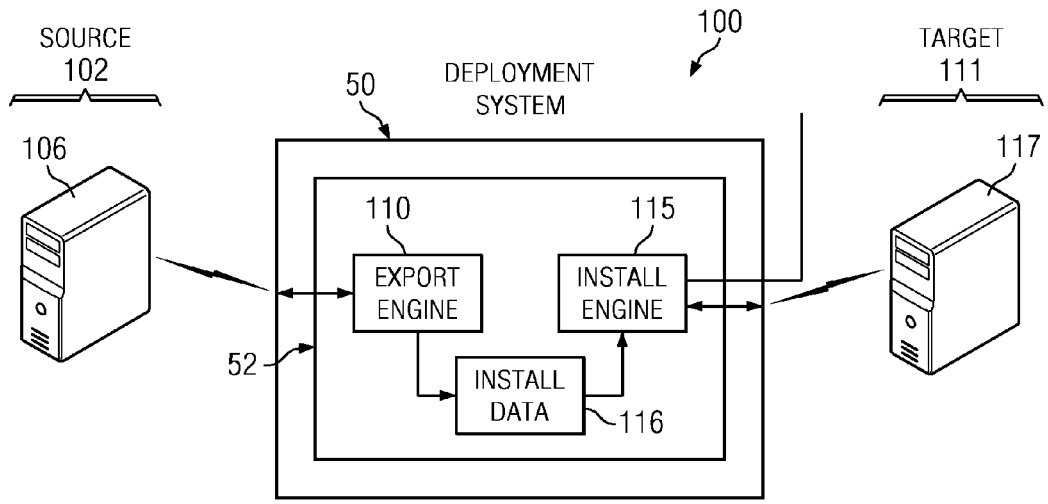
FIG. 1 is a schematic diagram illustrating an exemplary system architecture constructed in accordance with an embodiment of the disclosure.
Figure 2:
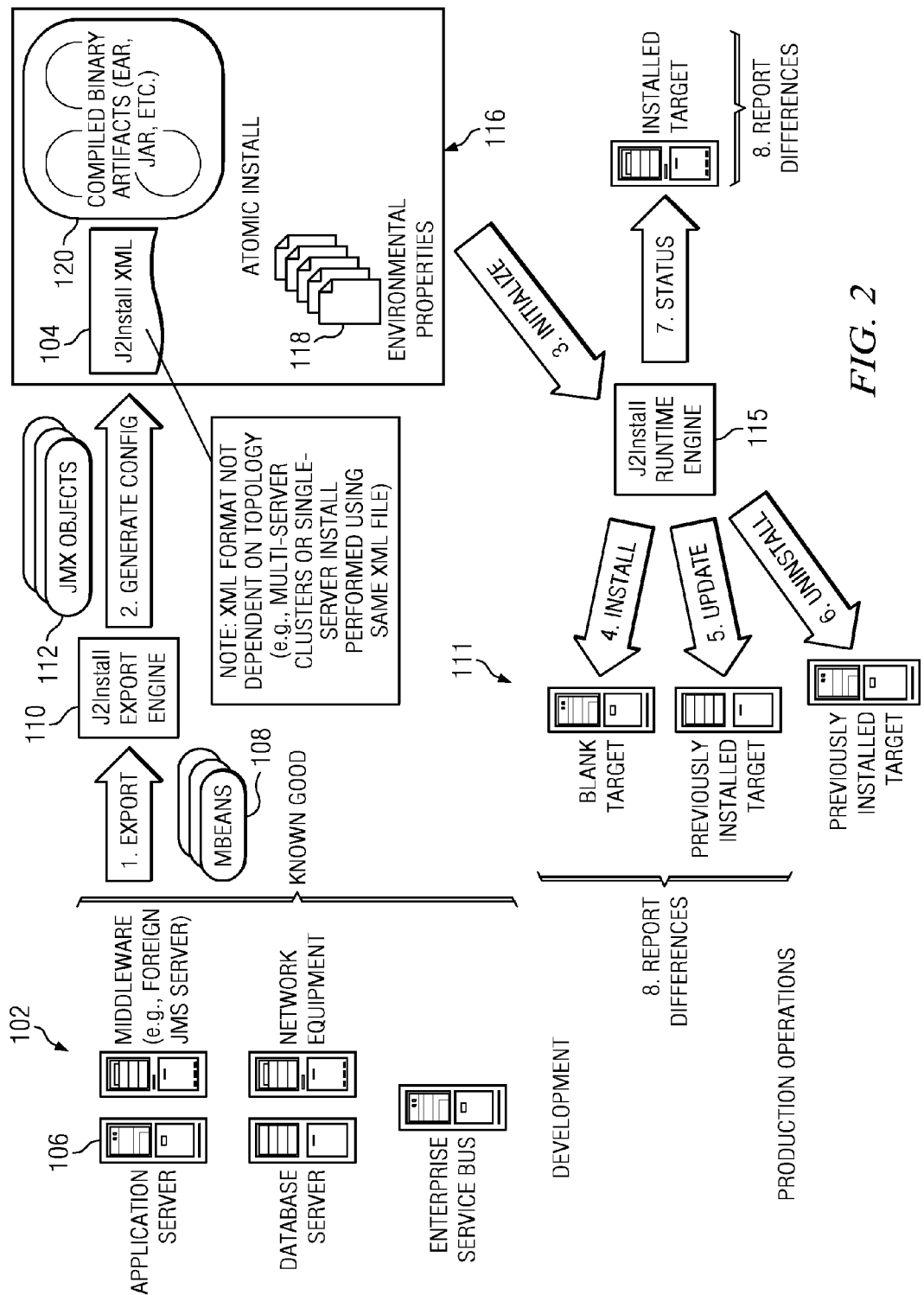
FIG. 2 is a schematic diagram illustrating another exemplary system architecture constructed in accordance with an embodiment of the disclosure.

FIG. 1 is a block diagram illustrating an embodiment of a system 100 for deploying an application from a source environment 102 to a target environment 111. Similarly, FIG. 2 shows a diagrammatic representation of deploying an application developed in a development environment 102 to a target environment 111. Development environment 102 can include any number of development systems such as an application server 106. Similarly, target environment 111 can contain any number of target systems such as a target application server 117.

Typically, a developer develops an application in a known good environment (such as an application server 106, a database server, or other known good environment). Once a developer has written an application in the development environment 102 (i.e., the known good environment), the configuration of the development environment can be analyzed and mapped to a representation that is not specific to the development environment. For example, the development server 106 configuration can be analyzed and mapped to an environmentally agnostic, or environmentally independent, representation of the configuration information. The configuration can then be mapped to the target environment.

A deployment system 50 deploys an application from development environment 102 to a target environment 111. Deployment system 50 can include any suitable computer or group of computers with processors, memory, and other components running deployment software 52. Deployment system 50, according to one embodiment, can connect to servers of development environment 102 and target environment 111 via a network (e.g., LAN, Internet, wireless network or other network or combination of networks known or developed in the art). Deployment software 52 can be responsible for mapping configuration information from server 106 to server 117. Deployment software 52 can include an export engine 110 and an install engine 115. Although shown separately in FIG. 1, export engine 110 and install engine 115 can be portions of monolithic code, modules, functions or subroutines of code, separate programs or be implemented in any suitable programming architecture. In some embodiments, the functionality of deployment software 52 can be distributed. By way of example, but not limitation, export engine 110 and install engine 115 can run on different computers.

Export engine 110 can query server 106 for configuration information related to a developed application (or other code). In general, the configuration information of an application server for an application can be of two types. First, the configuration information can be information that depends on the server environment such that the configuration information will change from application server to application server. The second type of configuration information does not change based on the server environment, though the format for expressing this information may change. Non-environmental configuration information can be extracted from a source environment and mapped to the information to the target environment. Environmental configuration information can be extracted from the source environment and the information changed appropriately for the target environment. The separation of configuration information into environmentally specific and non-environmentally specific information can greatly increase the efficiency of deployment as described below.

Environment dependent configuration information can be mapped to values specific to target server 117 while environment independent configuration information will remain equivalent between server 106 and server 117. Install engine 115 can map environment dependent and environment independent configuration information to the appropriate format used at target server 117.

FIG. 2 is a diagrammatic representation of one embodiment of deploying an application from a development server to an operational server in a J2EE environment. These two environments can vary widely. For instance, development environment 102 can be characterized by frequent changes in the application, the resources needed to support the application, and even in the development environment itself. In an operational environment on the other hand relatively few changes occur. However, the operational environment often requires that more and different parameters be tuned to properly configure the environment for the application.

Exporting Configuration Information

The mapping of source requirements to the target environment can begin with exporting an existing set of requirements. Accordingly, in one embodiment, the export functionality is generally a mapping and abstraction functionality. The general location of configuration information on a server is generally known. For example, J2EE servers typically have Mbeans that represent configuration information. An MBean 108 is a Java object that represents a manageable resource, such as an application, a service, a component, or a device. Thus, identifying the Mbeans associated with an application server's configuration information allows the identification of the resources necessary to operate the application. Depending on the vendor of the J2EE server application the configuration information will be stored in different Mbeans. Knowledge of a particular server application, however, allows a list, a tree, or other structure to be established that specifies the Mbeans that contain configuration information for the application server. For other types of service environments (e.g., database servers), the information on what data structures hold configuration information can similarly be specified based on knowledge of the vendor's database server application. As new data structures are added by a vendor, the data structures can be added to the knowledge base of deployment software 52.

In general, export engine 110 can interface with an application server through the application server's API and query the application server for the configuration information. Taking a J2EE application development server 106 as an example of a source environment, an export engine 110 can connect to the source environment 106 using the source environment API. To determine which MBeans 108 to export, the export engine 110 may utilize a series of properties files and an XML Schema Definition (XSD) tree associated with the application server which is typically known beforehand.

More particularly, the export engine 110 may walk through the XSD tree for the application server 106 and once it reaches an element type that represents an MBean 108, the export engine 110 can validate the MBean 108 type against the properties file. If the MBean type is valid and exists in the properties file, the export engine 110 can retrieve the MBean and create a development server 106 specific object modeled on the actual MBean object 108 found at the development server 106. All of the specified Mbeans for the server can be retrieved. Optionally, the configuration information from a server can be translated into a generic representation used by deployment program 52 to facilitate storage, translation, and management of the configuration information. For example, export engine 110 can translate object 108 to an XML object 112 (referred to as a JMX object herein) and persist the JMX object 112 to an object tree in the form of a generic XML file 104.

With reference again to FIG. 2, the various property files for the source environment 106 define how the attributes of the source environment specific objects 108 map to the JMX object 112. The attribute values of the JMX object 112 can have any data type.

The mapping of the source environment MBeans to the generic XML file 104 can occur because, while there may be various types of source environments (such as WebSphere or WebLogic), they typically utilize equivalent information expressed in different formats. Consequently, that information can be mapped to a format that is not dependent on the type of environment from which it came based on knowledge of how the source environment 106 expresses that information. Therefore, as new source environments 106 are developed, or existing source environments 106 are modified, new mappings between the source environments 106 and the generic objects 104 can be developed to allow for the exporting of the configuration information from these new sources.

Generating Generic Configurations

The configuration information, as discussed above, can include environment independent and environment specific configuration information. According to one embodiment, whether a particular piece of configuration information is environment dependent or environment agnostic can be identified. This can occur in a variety of manners. For example, it may be known that a particular MBean contains information that should not vary based on target environment, while another MBean contains information that will vary depending on the target environment. Whether a particular piece of information is environmental dependent or environmental independent can be predefined in deployment program 52. In other embodiments, a user may review the configuration information or a subset of the configuration information to specify which pieces of configuration information are environment dependent and which are environment agnostic.

According to one embodiment, deployment software can generate a representation of the configuration information. According to one embodiment, the environment agnostic representation can preserve information that is already environment agnostic and tokenize environment specific configuration information. Continuing with the previous example, export engine 110 can generate an XML configuration file 104. XML configuration file 104 can hold the environment agnostic configuration information as JMX objects 112. On the other hand, for the JMX objects 112 that represent environment specific information, configuration file 104 can include a token for the attribute values. For example, if the development application server typically accesses a database at one domain name, but target environments use other domain names, the domain name can be represented as a token ${domain name} that indicates the domain name must be set for the target environment. Again, mapping of information from the source environment to an environment agnostic representation can be facilitated by the fact that while the schemas of the source environments 102 may vary, they generally express equivalent information in known structures.

Initializing a Program to Configure the Target

After the source configuration information is mapped, that information can be used to configure other target environments 111 and to install the application thereon. In one embodiment, a run time engine 115 (e.g., a program) uses an installation atomic 116 to configure and install the application into the target environment(s) 111. As shown in FIG. 2, one embodiment of installation atomic 116 includes three parts. However, the installation atomic 116 may also be a logical collection. For example, the application binaries 120 can be located in a remote location such as a shared drive accessible by the target environment 111. That being said, the XML configuration file 104 can also be one of the components of the installation atomic 116. The generic configuration file 104 holds the non-environment related configuration information (such as information defined by the MBeans 108 and the MBean attributes that are not specific to any environment). Further, it may hold this information in the form of references to environment specific information.

The second component of the installation atomic 116 can be the environment properties document 118. The properties document 118 can be in the form of a text file, object, or some other format. Typically, the environment properties document 118 represents environment specific data that supplements the XML Configuration File 104 during subsequent installations. For instance, an application may need to access a data source provided by its environment but that is specified by the target environment user. Since different users may specify different data sources, the address of the data source can be represented generically rather than being blindly translated from the source environment 106. Thus, these particular properties typically represent information that varies depending on the target environment 111. These target specific requirements can be represented by tokens such as ${hostname} in configuration file 104 with a specific value provided for the token in environmental properties 118.

The third component of the installation atomic 116 of the one embodiment may be the compiled binary artifacts 120 (or in other words the application). In an application server environment, the binary artifacts 120 are typically EAR (enterprise archive), JAR (java archive), WAR (web archive), or RAR (Resource Adaptor Archive) files. These are typically provided by a SCM (source code management) build solution.

As mentioned previously, the run time engine 115 may use the installation atomic 116 to configure the target environment 111 and install the application thereon. The run time engine 115 can also uninstall, update, and status the application (and its environment) as well as run reports on the same. Regardless of the operation to be performed, once the run time engine 115 is initialized, the run time engine 115 can perform a sanity check on and validate the XML configuration file(s) 104, the environment related properties document 118, the compiled binaries 120, and the target environment 111. Since every target environment 111 may have a different methodology by which to install (and uninstall) the application, the runtime engine 115 may proceed based on the target's specific requirements. In this sense, the run time engine 115 can be described as being "target specific." However, a generic run time engine which can operate on any target environment 111 by encapsulating the target's 111 procedures can also be used. Regardless of the type of engine employed (generic or target specific), the run time engine 115 may then be directed to perform one or more of the following exemplary tasks: install, update, uninstall, status, or report on the application and its configuration.

Configuring and Installing Applications

In one embodiment, the run time engine 115 may begin an installation by performing a set of directives that encapsulate the process by which the application(s) is to be installed. The run time engine 115 can then map the configuration information represented in the environment agnostic XML files 104 (potentially using the environment properties document 118) to create target environment specific objects according to the appropriate schema for the target environment 111. Again, the generic representation of the configuration properties (or target environment representation) can be mapped to the format used by the target environment because different application servers tend to utilize equivalent information in known structures. Consequently, equivalent information can be mapped from one structure to another. Run time engine 115 can configure the target environment 111 accordingly by installing the configuration information in structures used by target environment 111. In one embodiment, the process of configuring the target environment 111 and installing the binaries 120 can be wrapped in a transaction. Thus, if any part of the installation fails the installation will then be rolled back to the last known good state. Additionally, as with the other functions of the run time engine 115, the changes it effects on the target environment 111 may be logged for reporting to the user at a convenient time (e.g., at the end of the installation).

Updating Applications

The run time engine 115 can also perform application updates (i.e., installing a more recent version of the application). The update process of the one embodiment is similar to the install process previously discussed. However, a "look ahead" process may be used to verify the ongoing status of the target environment during the update. The look ahead process checks whether particular configuration information is already present at target environment 111. For example, the look ahead process checks, before each MBean (or similar object for non J2EE environments) is configured, to determine whether a particular MBean already exists (for cases in which an MBean is being added) and whether a particular MBean is already absent (for cases in which an MBean is being deleted).

While the look ahead process is not required, it does increase the efficiency of the process. Accordingly, each of the functions of the run time engine 115 can employ a look ahead process. Additionally, for non-transaction based variations of the run time engine 115, the look ahead process allows the engine 115 to detect situations which might abort script based configuration procedures. For instance, when a scripted configuration encounters an MBean that it expects to install (or fails to find one it expects to delete), the script fails resulting in an indeterminate and undesirable state for the target environment 111. Thus, the look ahead process avoids this "brittle" nature of scripts.

As an example of the benefits of using the look ahead process, if the run time engine 115 is to update a specific MBean in the target 111, the run time engine 115 can query the target 111 to determine the status of that MBean 108. If the MBean in question does not exist, but is needed, then the run time engine 115 will create the MBean and set its attributes accordingly. However, if the MBean already exists, the look ahead process allows the run time engine 115 to verify the MBean attributes and, if needed, to adjust them accordingly. Preferably, as with the install process, the update process can be wrapped in a transaction. Thus, if the update fails, the target environment 111 can be rolled back to its last known good state.

Uninstalling Applications

The uninstall process is similar to the install process except it operates in reverse so that configuration information can be deleted using the configuration file 101. For example, any MBean listed, or otherwise represented, in the configuration file 104 can be removed from the target environment 111. However, in one embodiment, the run time engine 115 queries the target environment 111 to determine if any other application might be using the MBean. If so, the MBean is left as is. Regardless of how MBean deletions are handled, the uninstall process can be wrapped in a transaction too and can log changes it causes for reporting, roll back, and other purposes.

Application Status Reporting

To status an application, the run time engine 115 may also use a look ahead process similar to the one described previously. One difference between the update and status processes is that objects are not changed in the status process. Instead, the run time engine 115 runs through the installation without actually executing the installation steps and logs and reports the changes that would otherwise have been made if the current version of the application had been installed. One benefit of this operation is that it allows the user to understand what will change if, and when, the installation does occur.

Reporting Configuration Changes and Differences

The Report Differences process allows the run time engine 115 to determine differences in a given target environment 111 that may have occurred over time, regardless of topology. This process may operate by querying a target environment to determine the environment specific and environment agnostic configuration information previously discussed. Then, by comparing the newly acquired configuration information with a previous version of the configuration information, the Report Differences Process may determine whether any differences exist between the two configurations. Regardless of whether the changes were caused by legitimate configuration activity, inadvertence, or malicious attack the process allows any changes in the environment to be identified.

For example, the run time engine 115 could accomplish this task by performing an export (as discussed herein) coupled with creating an object tree using the information obtained during the export. The configuration of the target environment following the last known operation on the environment (or last known good XML file 104) can be used to generate a second object tree. The two object trees can then be compared to identify changes such as the existence of Mbeans 108 in one environment or differences in the associated attributes or their values. In another embodiment, the run time engine 115 can create an XML file 104 for a particular target environment before a change (e.g., install, update, or uninstall) is made and compare it to the XML file 104 created after the operation. The differences thereby identified can then be committed to other similar target environments 111 to modify them in a similar manner.

Figure 3:
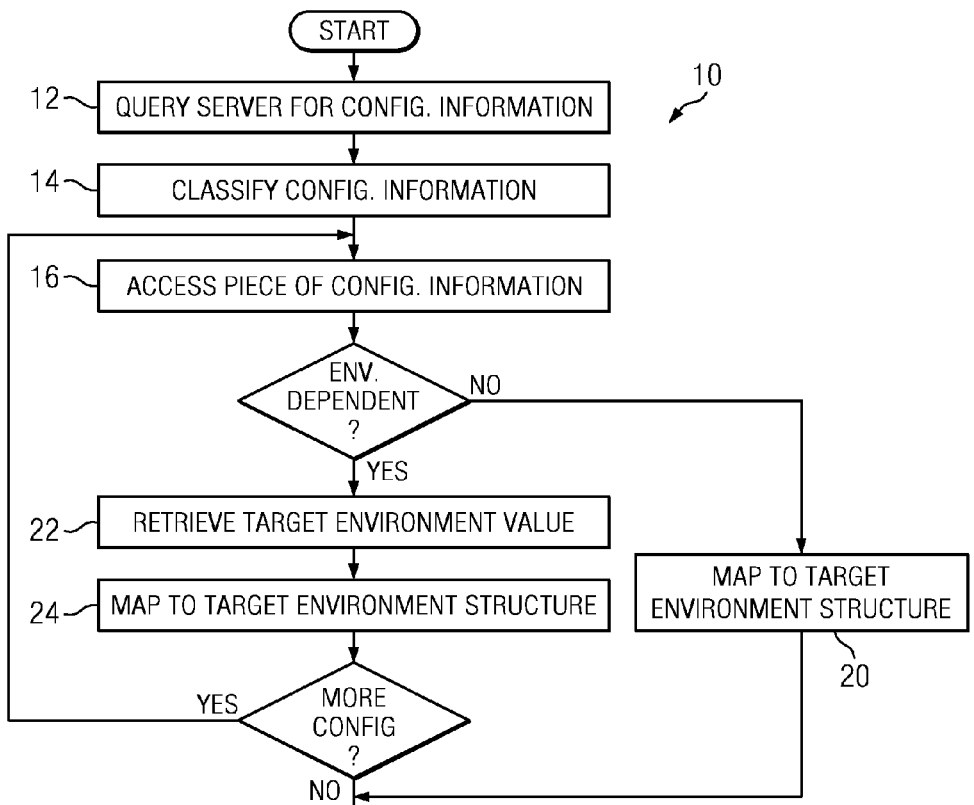
FIG. 3 is a flowchart illustrating a method practice in accordance with an embodiment of the disclosure.

Generally, with reference to FIG. 3, a flowchart illustrating one embodiment of a process of mapping a source environment to a target environment is shown. Application servers such as server 106 (shown in FIG. 1) can be queried for, configuration information (operation 12). The queried configuration information can then be classified depending on whether the information is environmentally dependent (operation 14). Each piece of configuration information can be accessed (operation 16) and processed. A piece of configuration that is environmentally independent can be mapped to the data structure used by the target environment (operation 20). A piece of configuration information that is environmentally dependent can be mapped to the target environment by selecting the value of the parameter for the target environment (operation 22) and structuring the information in the format used by the target environment (operation 24). Operations 20, 22, and 24 can be repeated for each piece of configuration information. Mapping configuration information from a source environment to a target environment can take any number of steps and, as discussed below, can optionally include mapping configuration information to an environmentally agnostic representation as discussed below. The method of FIG. 3 can be repeated as needed or desired.

Figure 4:
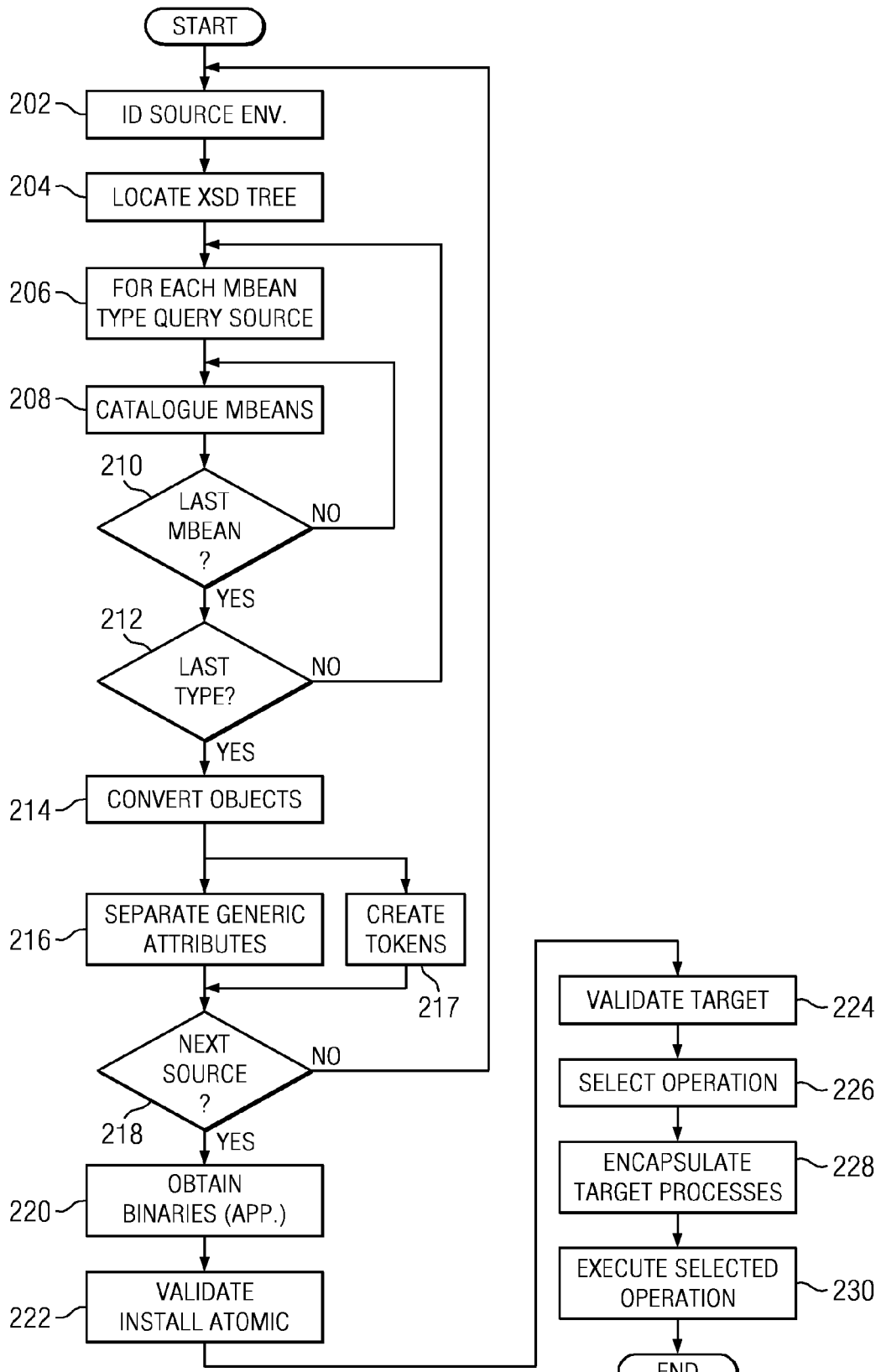
FIG. 4 is a flowchart depicting a method practiced in accordance with an embodiment of the disclosure.
Figure 5:
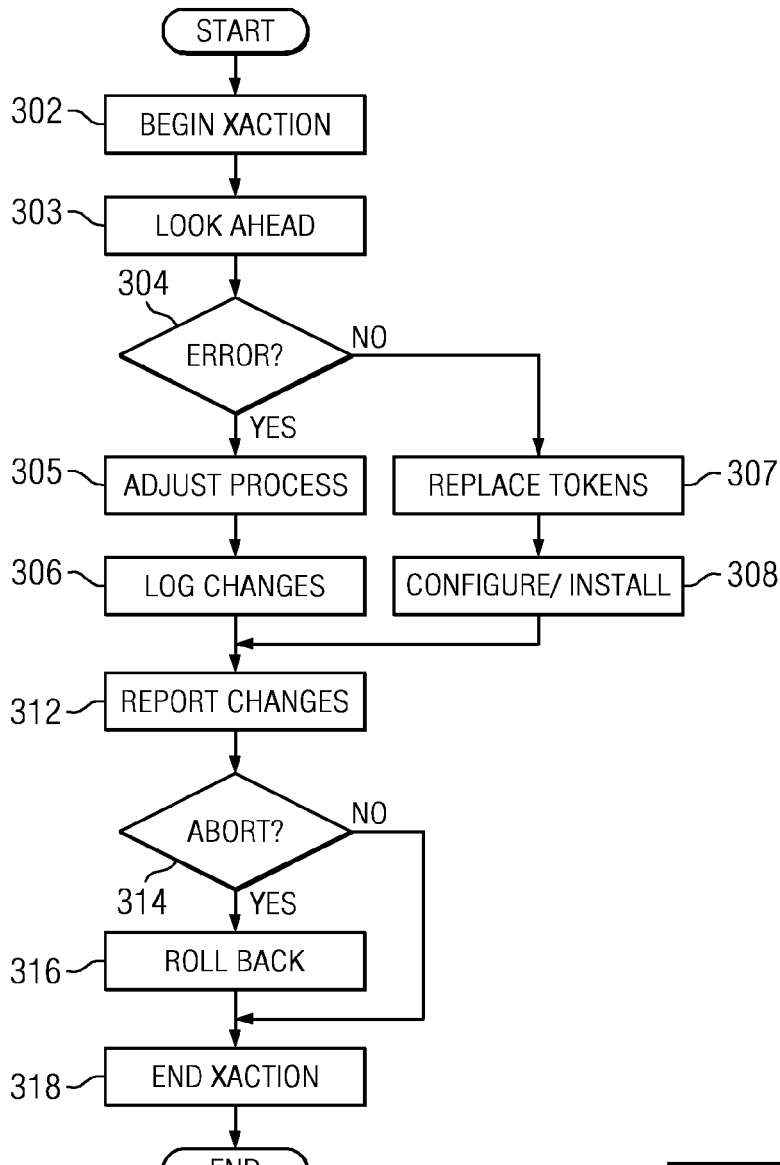
FIG. 5 is a flowchart depicting another method practiced in accordance with an embodiment of the disclosure.

FIGS. 4 and 5 illustrate additional exemplary methods. More particularly, FIG. 4 shows a method for mapping source requirements to a generic configuration document 104 (see FIG. 2) and a target specific properties document 118 (see FIG. 2). FIG. 5 shows a method of reconfiguring the target environment 111 during several types of operations. These operations typically include installing, updating, de-installing (i.e., uninstalling), reporting, and providing status of the application.

The method of FIG. 4 can begin with identifying the environment already existing on the source server 106 (operation 202). Typically, application servers 106 run server programs such as WebLogic (available from BEA Systems), WebSphere (available from IBM), or other server program which in turn provide mechanisms for the applications running on the server 106 to access the various resources on the server 106. Other readily available server programs such as OAS, JBoss, Tomcat, Apache, Netweaver, and Sun One also fill similar rolls. With the source environment 106 identified, the method can then proceed with locating the XSD tree associated with the application of interest as shown at operation 204.

Figure 6:
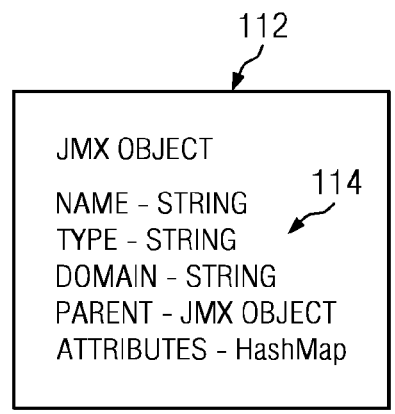
FIG. 6 is a diagrammatic representation of one embodiment of a JMX object.

In operation 206, the application server 106 can be queried for each type of MBean 108 that might be associated with the application to determine how many MBeans 108 of that type exist and what properties and attributes they possess (operation 208). The query for a particular type of MBean 108 can continue until all of the MBeans 108 of the type have been identified and cataloged (along with their attributes)(operation 210). The next type of MBean 108 can then be cataloged until all of the MBeans 108 have been cataloged (operation 212). In operation 214, the cataloged MBeans 108 can then be converted to generic data structures such as JMX objects 112 (see FIG. 6).

At operation 216, a configuration file can be created that identifies environment dependent and environment agnostic configuration information. For example, XML file 104 can be created based on the JMX objects 112 that include the environmental agnostic attributes and provides indicators of the environment dependent attributes. The values for the environment dependent attributes can be stored, for example, as a set of property files. According to one embodiment, XML document 104 can include all the configuration information. The XML document 104 is then parsed with a set of rules for determining into which category each piece of configuration information falls. For example, suppose that a particular data source appears in the XML document 104 as:

<DataSource Name=DS1'
JNDIName='com/domain/datasource/DS1'/>

The JNDI name will possibly change from environment to environment and unless the JNDI name is adjusted for the target environment 111 the configuration will typically fail. Thus, one rule in the set can be that all JNDI names will be treated as environment related information and will be placed in the environment properties document 118. Another example arises from network topology. At times, it may be necessary to configure an application on two different environments. One environment may be a 2-way cluster while the second environment may be a 4-way cluster. Thus, one rule in the set can be that topology information will be treated as environment related information and will be placed in the environment properties document 118. Still another example relates to the specific database vendor being used. At times, an application may be deployed in different environments using different database vendors. Thus, one rule in the set can be that database vendor information and appropriate database connection libraries will be treated as environment related information and will be placed in the environment properties document 118. Thus, these rules can categorize individual pieces of configuration information and can be predefined based on knowledge of the application servers, the development environment, and/or the target environment. Exceptions and newly needed rules can be handled on a case-by-case basis. To account for the environmental information taken from the generic XML document 104, operation 217 replaces the environmentally related information with a token in the XML document 104. As a result of this abstraction, the XML document 104 becomes generic to the particular application and thus independent of any particular environment. Also, the environmental information can be collected in a separate document of environmental properties 118.

Other source environments can be queried to create a library of possible environmental property documents 118 (operation 218). When a new target 111 is identified, the library can be searched for a matching, or closely matching, set of environmental properties 118. The closest match can then be quickly adjusted or tuned to account for the actual target environment 111. Target environment properties can be determined based on querying target environment 111 to create a target environment properties file 118. Information can also be provided to target environment property file 118 by a user.

The collection of binary files 120 that define the application can be obtained as in operation 220. Then, operation 222 can be used to validate the installation atomic 116 at a convenient time. Likewise, if desired, operation 224 can be used to validate the target environment 111. In operation 226, the user can select which operation (install, update, uninstall, status, or report) to perform on the target environment 111. Also, at a convenient time, the run time engine 115 can encapsulate the procedures that the target environment 111 uses for the selected operation (or possibly all of the target operations if desired) (operation 228).

At this point it is noted that the run time engine 115 has available to it what will be installed (the application along with the application related generic configuration file 104); how to install it (the target environment 111 related procedures); and details regarding where it will be installed (the properties file 118). In other words, the "what," the "where," and the "how" have been separated in the abstraction hierarchy of the one embodiment. Thus, the configuration of the target environment 111 for the application is separated from the implementation of the "how" and the "where" thereby simplifying and facilitating the overall configuration and installation process. Accordingly, the run time engine 115 can simply execute the selected operation when desired (operation 230).

Now with reference to FIG. 5, an embodiment of a method of configuring the target environment 111 and pushing the application out to the target environment 111 is illustrated. Initially, the method 300 can begin by starting a transaction for the selected operation (operation 302). Preferably, as the method continues the run time engine 115 begins looking ahead (operation 303) at each specific configuration task before actually implementing it to determine (operation 304) if any unusual situations might exist (e.g. a resource to be installed or deleted is already installed or deleted). If the run time engine 115 determines that such a situation exists, operation 305 allows the engine 115 to adjust for the situation without failing (e.g., skipping the installation or deletion). Additionally, the run time engine 115 can log the configuration changes as they are made as reference 306 illustrates.

Otherwise, the method continues for each configuration task in the application related configuration document 104 replacing the tokens with target specific information from the environmental properties document 118 as it goes (see operation 307). If any target specific configuration tasks are found in the environmental properties document 118, they too can be executed in operation 308. Once the target 111 is configured, the run time engine 115 can install, update or delete the binary files 116 of the application (as determined by the operation selected in operation 226 of FIG. 2) and report to the user the changes made as shown by operation 312.

If the selected operation is the creation of a prospective change report (to determine what would change if an operation were to be performed), then operation 314 allows the run time engine 115 to abort the transaction. Doing so can cause the run time engine 115 to roll back the changes (operation 316) made during method 300 with the report of operation 312 optionally serving as the prospective change report. Operation 316 illustrates the roll back of the changes. Otherwise, the transaction terminates with operation 318 as shown in FIG. 5.

In some embodiments, the software code comprises computer program instructions which can be stored on one or more computer readable media and executable by a processor. The term "computer-readable media" encompasses all types of data storage media that can be accessed and read by a computer. Examples of computer-readable media include computer memories such as read-only memory (ROM), random access memory (RAM), flash memory, and data storage devices such as floppy disks, disk drives, compact-disc ROM, tape drives, data cartridges, optical disks, or other types of non-transitory computer readable media. Microcontrollers that can be programmed to implement embodiments generally include on-chip memories on which the special software code embodying the automatic ranging algorithm/gain selection routine can be stored.

As shown by the foregoing disclosures, various embodiments accelerate the deployment of J2EE applications as well as many other types of programs such as those used in conjunction with networks, database servers, mobile networks, web-servers, and enterprise service buses. Moreover, practicing the exemplary methods described herein eliminates the error-prone, repetitive heartaches associated with the set up, configuration and migration of software running on web application servers (for example) regardless of the vendors, programs, or program versions involved. Developers and system administrators in particular can use the systems and methods taught herein to reduce errors, save time and reduce overall deployment costs. Additionally, the systems and methods disclosed herein catch and eliminate many more configuration defects than heretofore possible. They can also repeatedly guide the migration of applications between environments (e.g., from development to test to production) and automatically transform configurations for server upgrades. As a result, these systems and methods improve the "time to value" associated with a migration by delivering production-ready systems faster than possible with the prior art. They also make comparing configurations manageable, useful and simple. Software designed in accordance with the described embodiments can also be light-weight, fast, and reliable.

In addition, these embodiments take much of the risk and complexity out of application deployments and help organizations create repeatable and predictable installations, updates and un-installs in any environment and on any server. By automating formerly manual tasks, these systems and methods let IT support staff accomplish more with less, minimizing business risk and eliminating "Frankenstein" deployments. Instead, the techniques described herein allow automated migrations and deployments of application changes across systems and networks from development to test, staging, and production. These embodiments also allow comparisons to be made between configurations in one proprietary environment (e.g., WebLogic) and in another proprietary environment (e.g., WebSphere). The environment comparisons of the one embodiment, in turn, allow application support requirements to be translated during an automatic deployment of the application.

These advantages also accrue throughout all aspects of the typical application lifecycle: install, un-install, update, migrate, rollback, logging and export. Furthermore, the disclosed systems and methods allow support staff to pinpoint problems quickly and to gracefully and efficiently roll back changes to the last state, if necessary. Moreover, the robust logging herein disclosed allows support staff to quickly determine the root cause of errors should they occur.

Another embodiment provides for automatically generated installations from a known good instance (e.g., an operational application server) thereby eliminating the need for configuration and installation documentation. Also, because the configuration(s) can be tied to source control, the one embodiment allows abstract configurations to be automatically generated.

Furthermore, the embodiments presented herein provide strong, flexible solutions for breaking through the obstacles of cost, complexity, delay and risk associated with supporting applications. In other words, they make application deployment repeatable, reliable and dependable and assist support staff in deploying and extending applications with greater speed, less cost, and better accuracy. As an added advantage, these embodiments also take the complexity out of understanding deployment environments and help support staff quickly understand each server configuration, what changes were made, and the impacts of those changes. Moreover, the disclosed embodiments also provide mechanisms to easily deploy an application on any application server and in any environment. The exemplary systems, software programs, and related services constructed, or practiced, in accordance with the foregoing embodiments are available in BMC BladeLogic Application Release Automation by BMC Software of Houston, Tex.

Provisioning a Cloud Environment

It can be understand from the foregoing description that embodiments of applications can be deployed to and from a number of physical, virtual and cloud environments. A "cloud", for purposes of this application, is a scalable computer system or network that can be provisioned to create or mimic a desired hardware and software environment. Because many cloud environments can be provisioned to provide a scalable environment or an environment that can be created on demand, cloud computing is becoming increasingly popular for scalable applications or temporary events. Examples of clouds include, but are not limited to, Amazon Web Services' Elastic Compute Cloud ("EC2"), Vmware vCloud, Rackspace managed clouds, and other publicly available clouds. Embodiments described herein can also be applied to other virtual machine environments.

While cloud environments provide flexibility and scalability, they add a degree of complexity when installing applications because the cloud environment must be provisioned to provide a desired target environment prior to installing the application. Typically, the cloud is configured using an API made available by the cloud provider. A user can configure the cloud to provide an environment having particular processor, memory, network and application specifications. Once the environment is configured, the application can be deployed, versioned, uninstalled, etc. as described above. Many cloud APIs, however, require familiarity with the API that most developers do not have. Consequently, provisioning the cloud is a time consuming process. Once the cloud environment is provisioned, an application can be installed, updated, etc. as described above.

Embodiments described herein can be used to more efficiently provision a cloud environment. A snapshot of a specific environment can be taken and the characteristics of the environment mapped to abstractions of the characteristics. Additional characteristics can be provided by a user to change or augment the characteristics from the snapshot. A user can be led through the process of taking a snapshot and specifying environmental characteristics in a manner that does not require knowledge of the API. The characteristics or abstractions for the specified environment can be mapped to particular API calls to form a machine image that is used by the cloud provider to instantiate a desired target environment. When the target environment is running in the cloud, an application can be deployed.

Figure 7:
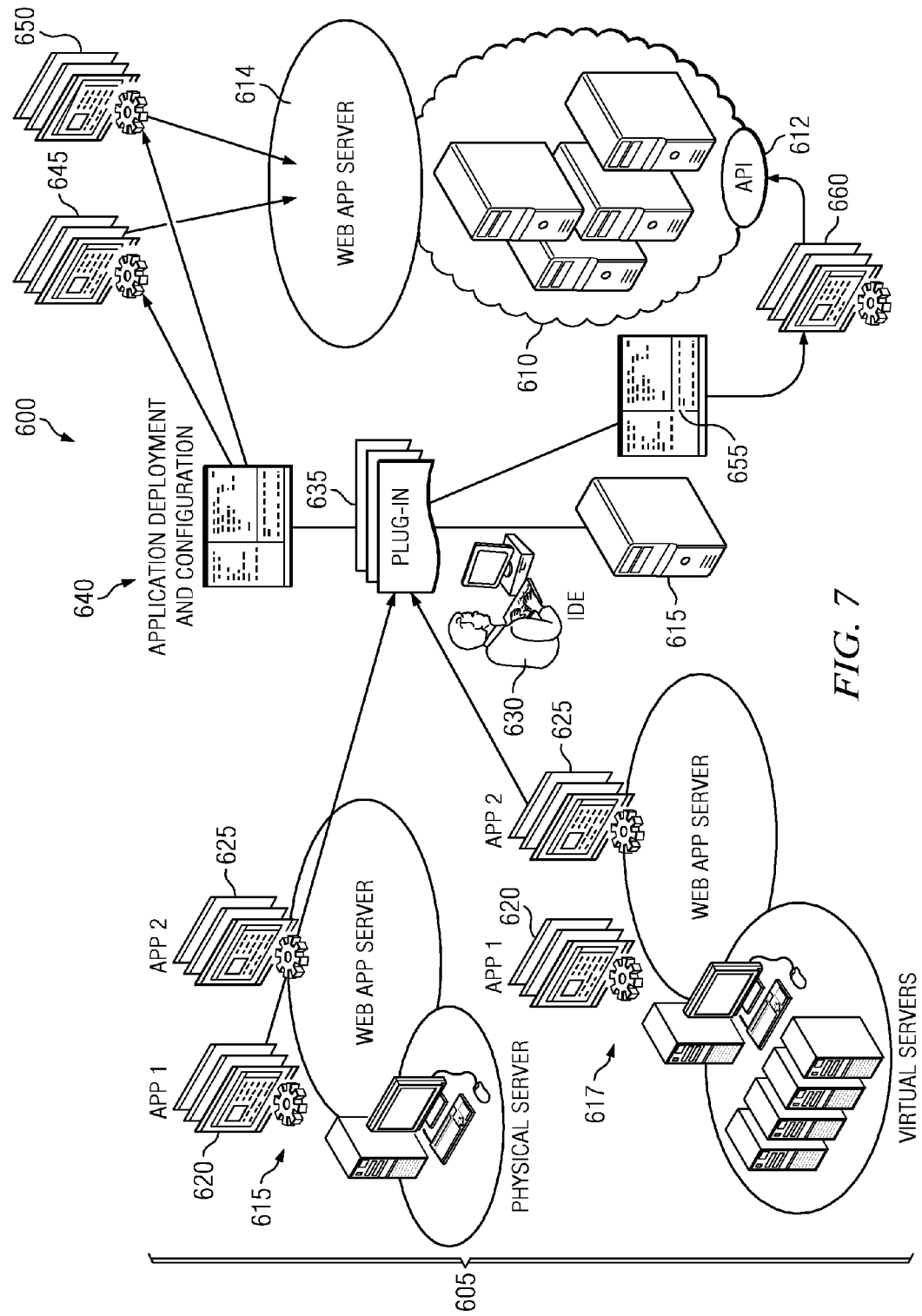
FIG. 7 is a diagrammatic representation of a system for provisioning a cloud and deploying an application.

FIG. 7 is a diagrammatic representation of deploying applications from a source environment 605 to a cloud environment 610 with a deployment system 615. Cloud environment 610 can provide a system of computers (potentially distributed across the globe) that can be provisioned to provide an environment with desired hardware and software characteristics. The provider of cloud environment 610 will often provide an API 612 for provisioning cloud environment 610. API 612 can be used to specify a machine image, which is a set of specifications that can be used to instantiate a desired target environment 614 in cloud environment 610.

API 612 can allow a user to specify hardware for target environment 614 including, but not limited to, a CPU, memory, storage, the number bits for the platform (e.g., 32 bit or 64 bit application platforms), I/O resources and other hardware information. API 612 can also allow for selection of software including, but not limited to, operating systems, database server applications, batch processing applications, web hosting applications, application development environments, application servers, media servers and other software. In some cases, a specific version of the operating system or other software can be selected. Rather than requiring selection of each hardware resource, however, some API's allow selection of an image type (e.g., small, large, extra large, etc.) that has a predefined machine image with a specified CPU, memory, storage, platform, and I/O resources. The predefined machine image can be modified to include selected software or other resources. When the selection of hardware, operating system and software is complete, the machine image can be stored as a file, in a database, or according to any suitable data storage scheme. The provider of cloud environment 610 can instantiate the machine image to provide an instance of the desired target environment 614.

Amazon Web Services, LLC, for example, provides the Amazon EC2 API that allows a user define an Amazon Machine Image ("AMI") that specifies all the information necessary to create an application server or environment instance in the EC2 Cloud. The EC2 API allows a user to select an image type with a set hardware configuration, operating system and software or create a custom AMI. The AMI can be stored on a server and instantiated as needed to create an instance of a target environment in the EC2 Cloud. Multiple instances of the machine image can be instantiated to scale target environment 614 as needed.

In operation, deployment system 615 can be used to provision cloud environment 610 to provide target environment 614 and deploy applications from source environment 605 to target environment 614. Source environment 605 can be a physical, virtual, cloud or other environment (e.g., as illustrated by source environment 615 and virtual environment 617). Applications 620 and 625 can be developed in or already be deployed in physical environment 615 and/or virtual environment 617. According to one embodiment, an integrated development environment ("IDE") 630 can be used to develop applications 620 and 625.

Deployment system 615 can run a deployment program 635 to deploy applications from IDE 630. In one embodiment, the deployment program 635 can be implemented as a plug-in to IDE 630. In other embodiments, deployment program 635 can be implemented as a separate program, as a portion of IDE 630, a portion of another program, as multiple programs or according to another suitable software architecture. The advantage of providing at least portions of deployment program 635 as a plug-in is that a developer can both develop an application and prepare the application for deployment in a single application environment.

Deployment program 635 can extract non-environmental configuration information for applications 620 and 625 and provide a user interface 640 to allow a user to specify environmentally dependent configuration information to create an installation atomic 645 and installation atomic 650 for applications 620 and 625. In some cases, the environmentally dependent configuration information can be set based on dynamic information from an instance of the target environment. For example, environmentally dependent configuration information may include the IP address of the target, the available memory of the target or other information established when the target environment is provisioned.

If an instance of a target environment 614 is already provisioned in cloud environment 610, installation atomic 645 and installation atomic 650 can be deployed to target environment 614. However, provisioning cloud environment 610 can be a time consuming task as many APIs 612 are complex and unfamiliar to those who do not often use them. To aid in deployment of applications into cloud environment 610, deployment program 635 provides for provisioning of cloud environment 610 into desired target environment 614 in a manner that reduces the complexity to the user.

According to one embodiment, deployment program 635 can take a snapshot of the hardware in source environment 605 or another specified environment. This can be done through the use of APIs, system administration tools or from IDE 630. Deployment program 635 can use the snapshot to determine hardware characteristics such as CPU, memory, storage, I/O resources, platform (number of bit platform) or other hardware characteristics. While in some embodiments, the snapshot may only include hardware characteristics, in other embodiments deployment program 635 can also determine an operating systems, application servers, database servers and other software information that can be used to provision cloud environment 610. The hardware and software characteristics) can be abstracted into classes of hardware, hardware requirements, classes of software, software requirements or other abstraction that can be mapped to API 612.

Deployment software can present a user interface 655 to allow a user to select various characteristics for provisioning cloud environment 610 including any of the hardware or software characteristics, topology, how the application should be metered or monitored or other characteristics. The user can be given the option to change all or some of the hardware or software information determined from the snapshot. According to one embodiment, user provided configuration information can be collected through configuration wizards that present cloud configuration options in an understandable format without requiring that the user have knowledge of API 612. The configuration information that can be selected by a user varies with cloud environment 610. Some cloud environments, for example, allow a user to select whether instances of target environment 614 should run on clustered servers in one or more regions of the world, while other cloud environments may not include this option. Thus, the options available to the user may depend on the cloud environment into which an application will be installed. Additionally, deployment program 635 may only allow the user to select a subset of options that could otherwise be configured through API 612.

Deployment program 635 can store the desired environment hardware and software characteristics or abstractions of the characteristics in cloud configuration information 660. This information can be stored in any suitable data storage format including, but not limited to one or more XML files having a schema, a database, a text file or other data storage format.

Deployment program 635 can interact with API 612 to provision target environment 614. In cases in which there is not an exact correspondence between the configuration information 660 and the available resources through API 612, deployment program 635 can apply rules to determine how to provision target environment 614. For example, if API 612 only makes available machine image types with preselected hardware and does not allow a user to specify a particular CPU and memory, deployment program 635 can treat hardware information in cloud configuration information 660 as minimum requirements and interact with API 612 to select an image type meeting those minimum requirements. Similarly, if cloud configuration information 660 specifies a particular version of an application server but that version is not available in cloud environment 610, deployment program 635 can include rules to select a compatible application server in cloud environment 610 using API 612. Any number or types of rules can be provided to provision cloud environment from cloud configuration information 660.

In another embodiment, deployment program 635 can map abstractions of hardware or software in cloud configuration information 660 to appropriate interactions with API 612. As an example, assume CPUs in cloud configuration information are represented by an abstraction of processing power (e.g., small, medium or large). Deployment program can be configured to make particular API calls to API 612 based on whether the processor is specified as small, medium or large. The machine image formed will specify an appropriate processor for the abstraction while not necessarily being the same processor that appeared in the original environment. It should be noted that while in the simple example above the abstraction represents a single hardware resource, an abstraction may represent multiple resources, an environment as a whole, or a subset of specifications of a resource. Furthermore, the mapping between cloud configuration information 660 and API 612 may depend on multiple pieces of information. The use of abstractions reduces the complexity of deployment program 635, eases expandability for new APIs and makes updating deployment program 635 to account for changes in APIs 612 more efficient.

When an image for target environment 614 is provisioned, deployment program 635 can return any necessary information to a user, such as log-in information, the storage location of machine image files or other information. Additionally, deployment program 635 can set environment dependent parameters for installation atomic 645 and 650. As just one example of this, if target environment 614 includes a database domain name, and the database domain name is an environment dependent parameter for application 620, deployment program 635 can set the database domain name in environment properties 118 (see FIG. 2) for application 620.

Deployment program 635 can use API 612 to cause an instance of target environment 614 to be instantiated in cloud environment 610. Once target environment 614 is running, applications 620 and 625 can be installed as described previously.

While deployment program 635 is represented as a single program in FIG. 7, it should be understood that deployment program 635 can be distributed so that different systems, entities or users can control particular functionality.

Figure 8:
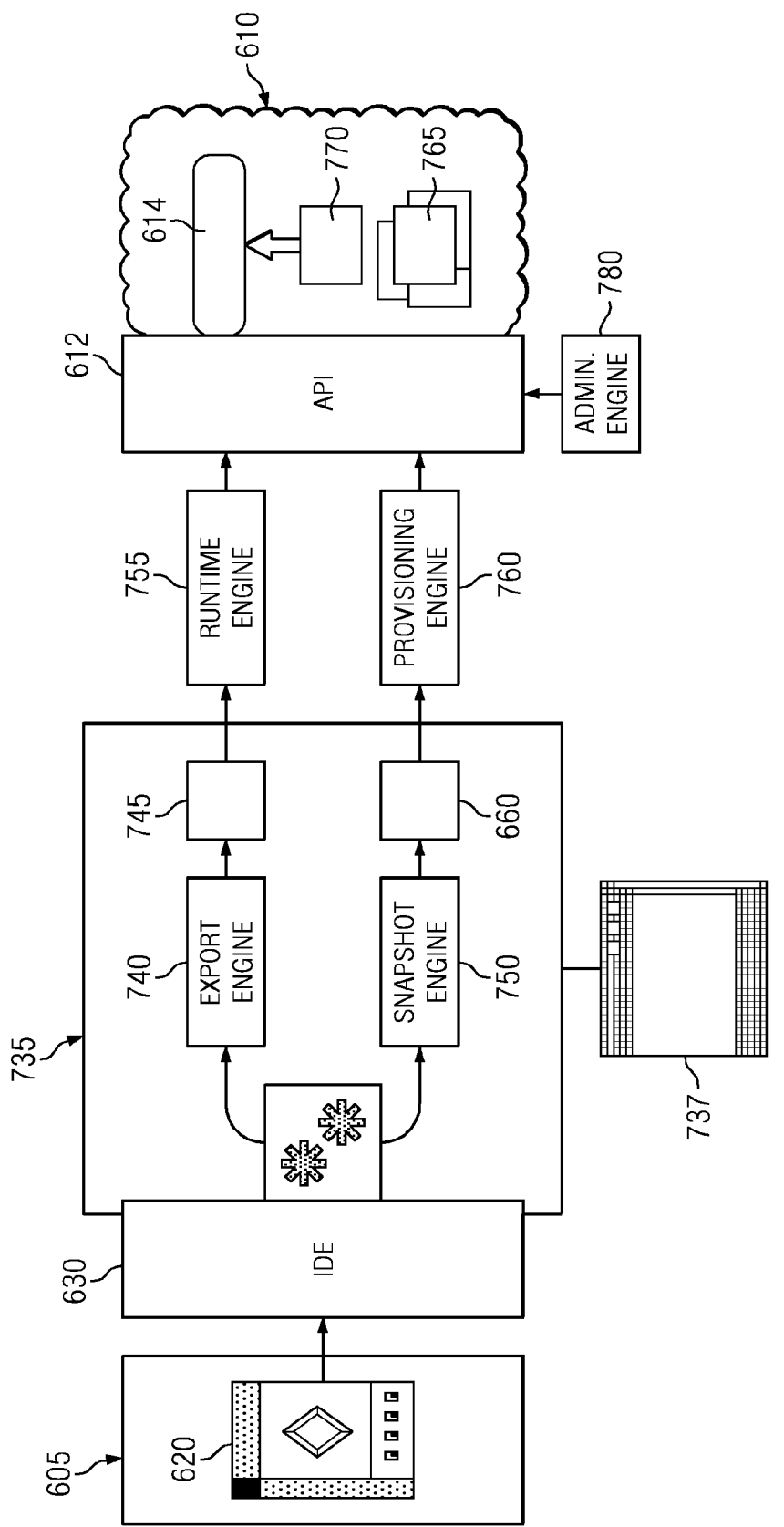
FIG. 8 is a diagrammatic representation of provisioning a cloud and deploying an application.

FIG. 8 is a diagrammatic representation of one embodiment of installing an application 620 from source environment 605 to cloud environment 610. In the embodiment of FIG. 7, deployment functionally is divided into multiple programs. According to one embodiment, a plug-in 735 to IDE 630 can be used to extract application and cloud configuration information. An export engine 740 can extract environment dependent and independent parameters and allow a user to set environment dependent parameters as described above. In some cases, the environment dependent parameters can be changed later if the values for these parameters change based on provisioning cloud environment 610. The application configuration information 745 can be stored as an installation atomic or according to another suitable data storage scheme.

Snapshot engine 750 can take a snapshot of a specified hardware environment (e.g., source environment 605 or another environment) and output hardware and software characteristics of the environment. While snapshot engine 750 can collect any amount of configuration information, it can also be configured to collect a snapshot of only information that is useful in configuring cloud environment 610. According to one embodiment, snapshot engine 750 can take the specific hardware and software configuration of an environment and create abstracted hardware and software configuration information for the target environment. A user can specify additional configuration information through user interface 737 or adjust the hardware or software information determined by snapshot engine 750. Plug-in 735 can store a set of cloud configuration information 660 based on the snapshot and user input. The application configuration information 745 can be passed to a runtime engine 755 and cloud configuration information 660 can be passed to a provisioning engine 760.

Provisioning engine 760 uses the cloud configuration information 660 to make appropriate API calls to API 612 to provision cloud environment 610. In some cases this may include using or modifying existing machine images 765 that were established by the provider of cloud environment 610 or were previously defined. Amazon Web Services LLC, for example, provides a number of baseline AMIs for the EC2 and users can store their own template AMIs. Existing machine images 765 can include any number or granularity of machine images. The existing machine images can be stored in cloud environment 610 or another location.

Provisioning engine 760 can map cloud configuration information 660 to an existing machine image 765 and modify it as needed based on cloud configuration information 660. As an example, provisioning engine 760 can map abstractions in cloud configuration information to API calls for a particular machine image having a specified hardware configuration, operating system and application server, and also interact with API 612 to adjust the amount of storage for the image and the version of the application server. The modified image can be stored as a machine image for target environment 614. Alternatively, provisioning engine 760 can interact with API 612 to build a new machine image from scratch. Once a machine image is established (represented at 770) any number of instances of the machine image can be invoked in cloud environment 610 to create a desired target environment 614.

Provisioning engine 760 can provide information to runtime engine 755, export engine 740 or other component based on the dynamic environment of the cloud. For example, provisioning engine 760 can determine the IP address of an instance of a machine image and provide that to runtime engine 755. In another example, if the installation of an application depends on the amount of memory available, provisioning engine 760 can provide the amount of member to runtime engine 755 so that runtime engine 755 can perform the correct installation. Thus, provisioning engine can provide dynamic information for the cloud target environment that can be used by the application installation components. Such dynamic information can also be used during other operations such as updating, uninstalling, rolling back or otherwise changing applications in the target environment.

In the example of FIG. 8, runtime engine 755 can receive application configuration information 745 and deploy the application to the target environment through API 612 or through another API to the target environment 614. If needed, some environment dependent variables may be adjusted to account for the target environment 614 as provisioned in cloud environment 610 prior to deployment.

Figure 9:
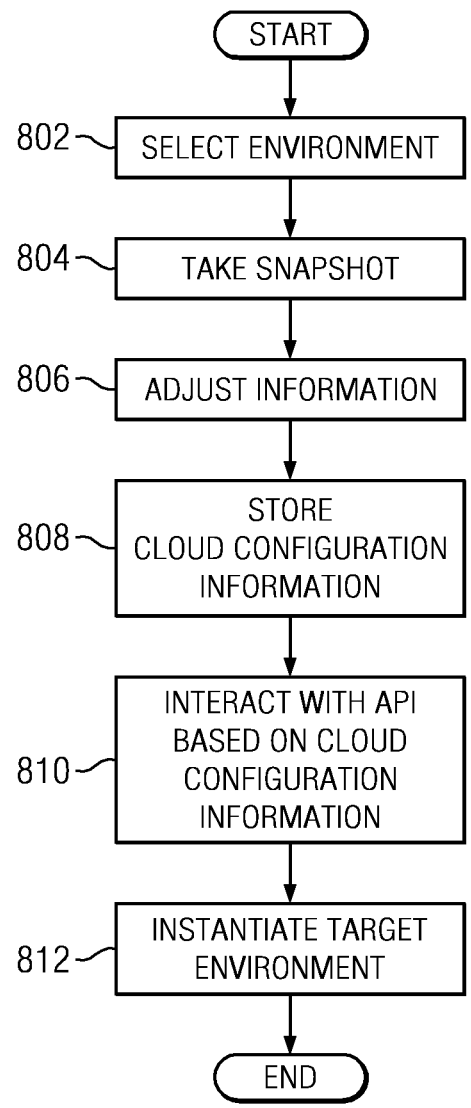
FIG. 9 is a flow chart for one embodiment of provisioning a cloud.

Turning briefly to the next figure, FIG. 9 is a flow chart illustrating one embodiment of provisioning a cloud environment. At step 802, a user selects an environment to snapshot. At step 804, a snapshot engine can take a snapshot of the physical environment. The user, at step 806, can provide additional configuration information. This can be done through the use of wizards that do not require that the user understand the API for the cloud environment to which an application will be deployed. The snapshot engine or other program can abstract information from the physical environment and user inputs into abstractions that are stored as cloud configuration information (step 808). A provisioning engine can map the cloud configuration information to appropriate API calls to establish a machine image (step 810) and instantiate an instance or number of instances of the machine image to establish a target environment in the cloud environment (step 812). Once the target environment is running, applications can be deployed to the target environment. The steps of FIG. 9 can be repeated as needed or desired.

Returning to FIG. 8, in addition to provisioning the target environment, embodiments described herein can ease administration of the target environment. A user can be presented with wizards or other user interface to specify metering and monitoring rules. The user specifications can be mapped, either directly or through an abstraction, to API interactions to meter and monitor the target environment. A cloud administration engine 780 can interact with API 612 to enforce metering and utilization rules established by a user.

Figure 10:
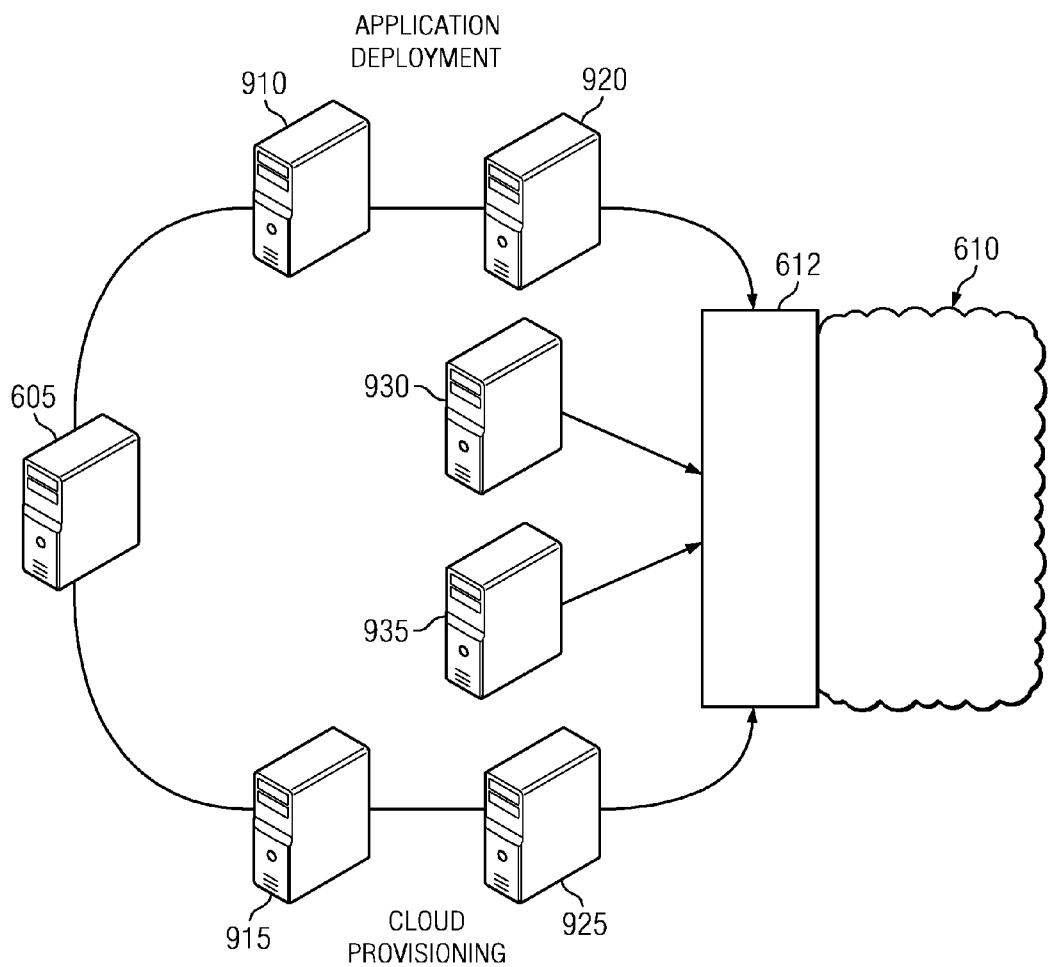
FIG. 10 is a diagrammatic representation of a system for deploying an application, provisioning a cloud and providing administration for a target environment in a cloud.

The previously provided embodiments are provided by way of example and it should be understood that embodiments described herein are provided for illustration. Application deployment and cloud provisioning can be implemented according to a variety software and hardware architectures. For example, while shown as a plug-in, export engine 740 and snapshot engine 750 may be separate from IDE 630 and may be separate programs from each other. Similarly, various portions of a deployment program can be implemented on different systems, so that, for example, provisioning engine 760 is remote from snapshot engine 750, export engine 740 is remote from runtime engine 755 and so on. FIG. 10, for example, illustrates that there can be a number of systems to achieve application deployment and cloud provisioning. In the example of FIG. 10, there is an application configuration extraction system 910, hardware configuration information extraction system 915, application deployment system 920, cloud provisioning system 925, metering system 930 and monitoring system 935. Each of these systems can include hardware, software, and/or firmware as needed to perform functions to deploy an application, provision cloud environment 610 and administer cloud environment 610. These systems can be provided on any number of computers and can be combined on a single computer. Similarly, deployment and provisioning can be implemented using any number of different programs. Furthermore, other operations including updating, uninstalling, etc. can be performed as described above.

Figure 11:
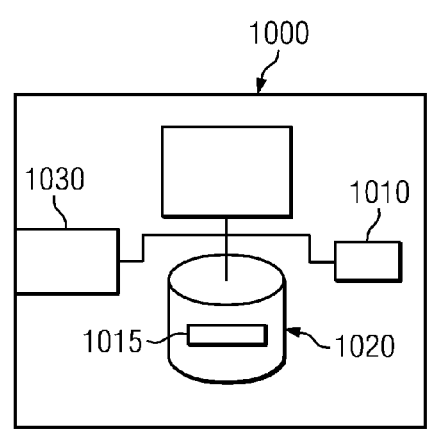
FIG. 11 is a diagrammatic representation of one embodiment of a deployment system.

One embodiment can be implemented as a set of instructions stored on a computer readable media. FIG. 11, illustrates a deployment system 1000 having a processor 1005, memory 1010 and a set of instructions 1015 stored on the computer readable media 1020 (RAM, ROM, hard drive, optical drive or other computer readable media). A network interface 1030 can provide for communication over a wired or wireless network. Instructions 1015 can be executed by processor 1005 to perform application deployment, cloud provisioning and cloud administration. Deployment system 1000 can include any additional software including, but not limited to, operating systems, IDE applications or other programs. While shown on a single computer, instructions 1015 can be distributed as needed or desired.

Although embodiments have been described in detail herein, it should be understood that the description is by way of example only and is not to be construed in a limiting sense. It is to be further understood, therefore, that numerous changes in the details of the embodiments and additional embodiments will be apparent, and may be made by, persons of ordinary skill in the art having reference to this description. It is contemplated that all such changes and additional embodiments are within scope of the claims.

What is claimed is:

1. A method comprising:
    querying a first sever program for a first set of configuration information for an application installed in a first environment;
    identifying a set of environment independent attributes from the first set of configuration information;
    identifying a set of environment dependent attributes from the first set of configuration information;
    mapping the set of environment independent attributes to a selected format for the set of environment independent attributes;
    receiving attribute values for one or more the environment dependent attributes for a selected target environment and mapping the one or more environment dependent attributes to a selected format for environment dependent variables;
prior to installing the application in a cloud environment, provisioning a selected target environment within the cloud environment on which to install the application; and
installing the application in the selected target environment in the cloud environment using the environment independent attributes and the received attribute values for the environment dependent attributes, wherein provisioning the selected target environment includes:
presenting a user with a wizard that allows the user to enter user-selected environment characteristics without requiring knowledge of a cloud environment application programming interface (API),
determining a first set of environment characteristics for the first environment, wherein the first set of environment characteristics comprise hardware characteristics,
receiving a set of user-selected environment characteristics through the wizard,
mapping the first set of environment characteristics and the set of user-selected environment characteristics to a set of abstracted characteristics,
mapping the set of abstracted characteristics API calls for the cloud environment, the API calls selected to provision the selected target environment in the cloud environment, and
interacting with the cloud environment API using the API calls to configure the cloud environment to provide the selected target environment.

2. The method of claim 1, wherein at least one of the first set of environment characteristics and user-selected environment characteristics comprise software characteristics.

3. The method of claim 1, further comprising applying one or more rules to select one or more API calls based on an abstracted environment characteristic.

4. The method of claim 3, further comprising treating hardware information in the set of abstracted characteristics as minimum hardware requirements; and
selecting API calls to provision a selected machine image supported by the cloud environment having at least the minimum hardware requirements.

5. A computer program product comprising a non-transitory computer readable medium storing a set of computer instructions comprising instructions executable to:
provide a system comprising an export engine, a provisioning engine and an install engine;
query a first sever program for a first set of configuration information for an application installed in a first environment, wherein the querying is performed by the export engine;
identify a set of environment independent attributes from the first set of configuration information, wherein the identifying is performed by the export engine;
identify a set of environment dependent attributes from the first set of configuration information, wherein the identifying is performed by the export engine;
map the set of environment independent attributes to a selected format for the set of environment independent attributes, wherein the mapping is performed by the export engine;
receive attribute values for one or more the environment dependent attributes for a selected target environment and mapping the one or more environment dependent attributes to a selected format for environment dependent variables, wherein the receiving and mapping are performed by the export engine;
prior to installing the application in a cloud environment, provision the selected target environment within the cloud environment on which to install the application, wherein the provisioning is performed by the provisioning engine; and
install the application in the selected target environment in the cloud environment according to the set of target environment configuration information and using the environment independent attributes and the received attribute values for the environment dependent attributes, wherein the installing is performed by the install engine, wherein the set of computer executable instructions executable to provision the selected target environment within the cloud environment further comprise instructions executable to:
provide a snapshot engine, a user interface and the provisioning engine,
present a user with a wizard that allows the user to enter user-selected environment characteristics without requiring knowledge of the cloud environment application programming interface (API),
determine a first set of environment characteristics for the first environment, wherein the first set of environment characteristics comprise hardware characteristics, wherein the first set of environment characteristics are determined by the snapshot engine,
receive a set of user-selected environment characteristics, wherein the set of user-selected environment characteristics are received through the wizard using the user interface;
map the first set of environment characteristics and the set of user-selected environment characteristics to a set of abstracted characteristics;
map the set of abstracted characteristics to API calls for the cloud environment, the API calls selected to provision the selected target environment in the cloud environment, wherein the set of abstracted characteristics are mapped to API calls by the provisioning engine, and
interact with the cloud environment API using the API calls to configure the cloud environment to provide the selected target environment, wherein the interacting is performed by the provisioning engine.

6. The computer program product of claim 5, wherein at least one of the first set of environment characteristics or user-selected environment characteristics comprise software characteristics.

7. The computer program product of claim 5, further comprising instructions executable to apply one or more rules to select one or more API calls based on an abstracted environment characteristic.

8. The computer program product of claim 7, further comprising instructions executable to:
treat hardware information in the set of abstracted characteristics as minimum hardware requirements; and
select API calls to provision a selected machine image supported by the cloud environment having at least the minimum hardware requirements.

9. A system comprising:
a network;
a deployment system coupled to the network, the deployment system configured to:
interface with a development environment;
interface with a cloud environment over a network;

query a first sever program for a first set of configuration information for an application installed in a first environment;
identify a set of environment independent attributes from the first set of configuration information for the development environment;
identify a set of environment dependent attributes from the first set of configuration information for the development environment;
map the set of environment independent attributes to a selected format for the set of environment independent attributes;
receive attribute values for one or more the environment dependent attributes for a selected target environment and mapping the one or more environment dependent attributes to a selected format for environment dependent variables;
prior to installing the application in the cloud environment, provision the selected target environment within the cloud environment on which to install the application; and
install the application in the selected target environment in the cloud environment using the environment independent attributes and the received attribute values for the environment dependent attributes, wherein provisioning the selected target environment within the cloud environment by the deployment system includes the deployment system being further configured to:
- present a user with a wizard that allows the user to enter user-selected environment characteristics without requiring knowledge of a cloud environment application programming interface (API),
- determine a first set of environment characteristics for the first environment, wherein the first set of environment characteristics comprise hardware characteristics,
- receive a set of user-selected environment characteristics through the wizard,
- map the first set of environment characteristics and the set of user-selected environment characteristics to a set of abstracted characteristics,
- map the set of abstracted characteristics to API calls for the cloud environment, the API calls selected to provision the selected target environment in the cloud environment, and
- interact with the cloud environment API using the API calls to configure the cloud environment to provide the selected target environment.

10. The system of claim 9, wherein at least one of the first set of environment characteristics and user-selected environment characteristics comprise software characteristics.

11. The system of claim 9, wherein the deployment system is further configured to apply one or more rules to select one or more API calls based on an abstracted environment characteristic.

12. The system of claim 11, wherein the deployment system is further configured to:
treat hardware information in the set of abstracted characteristics as minimum hardware requirements; and
select API calls to provision a selected machine image supported by the cloud environment having at least the minimum hardware requirements.

13. The system of claim 9, wherein the deployment system is further configured to store the first set of environment characteristics and set of user-selected characteristics in one or more XML files.

14. The system of claim 9, wherein the deployment system is further configured to provide attribute values for one or more environment dependent attributes based on at least one environment characteristic from the first set of characteristics or set of user-selected characteristics.

\* \* \* \* \*